United States Patent
Sikka et al.

(10) Patent No.: US 11,907,146 B2
(45) Date of Patent: Feb. 20, 2024

(54) SYSTEMS AND METHODS FOR INTELLIGENTLY IMPLEMENTING CONCURRENT TRANSFERS OF DATA WITHIN A MACHINE PERCEPTION AND DENSE ALGORITHM INTEGRATED CIRCUIT

(71) Applicant: quadric.io, Inc., Burlingame, CA (US)

(72) Inventors: Aman Sikka, Burlingame, CA (US);
Marian Petre, Burlingame, CA (US);
Nigel Drego, Burlingame, CA (US);
Veerbhan Kheterpal, Burlingame, CA (US)

(73) Assignee: quadric.io, Inc., Burlingame, CA (US)

( * ) Notice: Subject to any disclaimer, the term of this patent is extended or adjusted under 35 U.S.C. 154(b) by 0 days.

(21) Appl. No.: 17/987,703

(22) Filed: Nov. 15, 2022

(65) Prior Publication Data

US 2023/0073276 A1 Mar. 9, 2023

Related U.S. Application Data

(63) Continuation of application No. 17/710,353, filed on Mar. 31, 2022, now Pat. No. 11,531,633.

(60) Provisional application No. 63/169,673, filed on Apr. 1, 2021.

(51) Int. Cl.
*G06F 13/28* (2006.01)

(52) U.S. Cl.
CPC .......... *G06F 13/28* (2013.01); *G06F 2213/28* (2013.01)

(58) Field of Classification Search
CPC .............................. G06F 13/28; G06F 2213/28
See application file for complete search history.

(56) References Cited

U.S. PATENT DOCUMENTS

| | | | |
|---|---|---|---|
| 10,365,860 B1 | 7/2019 | Drego et al. | |
| 10,691,464 B1 | 6/2020 | Drego et al. | |
| 10,997,115 B2 | 5/2021 | Drego et al. | |
| 11,531,633 B2 * | 12/2022 | Sikka ...................... | G06F 13/28 |
| 2004/0258147 A1 | 12/2004 | Lee | |

(Continued)

OTHER PUBLICATIONS

Lin et al., "Automatic Loop Tiling for Direct Memory Access," 2011 IEEE International Parallel & Distributed Processing Symposium, 2011, pp. 479-489.

*Primary Examiner* — Glenn A. Auve
(74) *Attorney, Agent, or Firm* — Padowithz Alce; Alce PLLC

(57) ABSTRACT

System and method for implementing accelerated memory transfers in an integrated circuit includes identifying memory access parameters for configuring memory access instructions for accessing a target corpus of data from within a defined region of an n-dimensional memory; converting the memory access parameters to direct memory access (DMA) controller-executable instructions, wherein the converting includes: (i) defining dimensions of a data access tile based on a first parameter of the memory access parameters; (ii) generating multi-directional data accessing instructions that, when executed, automatically moves the data access tile along multiple distinct axes within the defined region of the n-dimensional memory based at least on a second parameter of the memory access parameters; transferring a corpus of data from the n-dimensional memory to a target memory based on executing the DMA controller-executable instructions.

20 Claims, 6 Drawing Sheets

(56) References Cited

U.S. PATENT DOCUMENTS

| | | |
|---|---|---|
| 2017/0004092 A1 | 1/2017 | Haraden et al. |
| 2018/0011786 A1 | 1/2018 | Kim |
| 2021/0090328 A1 | 3/2021 | Laddha et al. |
| 2021/0263865 A1 | 8/2021 | Lee et al. |
| 2022/0092408 A1 | 3/2022 | Khaitan |

* cited by examiner

SYSTEMS AND METHODS FOR INTELLIGENTLY IMPLEMENTING CONCURRENT TRANSFERS OF DATA WITHIN A MACHINE PERCEPTION AND DENSE ALGORITHM INTEGRATED CIRCUIT

CROSS-REFERENCE TO RELATED APPLICATIONS

This application is a continuation of U.S. patent application Ser. No. 17/710,353, filed 31-Mar.-2022, which claims the benefit of U.S. Provisional Application No. 63/169,673, filed 1-Apr.-2021, which are incorporated herein in their entireties by this reference.

TECHNICAL FIELD

The one or more inventions described herein relate generally to the integrated circuitry field, and more specifically to a new and useful perception and dense algorithm processing integrated circuitry architecture in the integrated circuitry field.

BACKGROUND

Modern applications of artificial intelligence and generally, machine learning appear to be driving innovations in robotics and specifically, in technologies involving autonomous robotics and autonomous vehicles. Also, the developments in machine perception technology have enabled the abilities of many of the implementations in the autonomous robotics' and autonomous vehicles' spaces to perceive vision, perceive hearing, and perceive touch among many other capabilities that allow machines to comprehend their environments.

The underlying perception technologies applied to these autonomous implementations include a number of advanced and capable sensors that often allow for a rich capture of environments surrounding the autonomous robots and/or autonomous vehicles. However, while many of these advanced and capable sensors may enable a robust capture of the physical environments of many autonomous implementations, the underlying processing circuitry that may function to process the various sensor signal data from the sensors often lack in corresponding robust processing capabilities sufficient to allow for high performance and real-time computing of the sensor signal data.

The underlying processing circuitry often include general purpose integrated circuits including central processing units (CPUs) and graphic processing units (GPU). In many applications, GPUs are implemented rather than CPUs because GPUs are capable of executing bulky or large amounts of computations relative to CPUs. However, the architectures of most GPUs are not optimized for handling many of the complex machine learning algorithms (e.g., neural network algorithms, etc.) used in machine perception technology. For instance, the autonomous vehicle space includes multiple perception processing needs that extend beyond merely recognizing vehicles and persons. Autonomous vehicles have been implemented with advanced sensor suites that provide a fusion of sensor data that enable route or path planning for autonomous vehicles. But, modern GPUs are not constructed for handling these additional high computation tasks.

At best, to enable a GPU or similar processing circuitry to handle additional sensor processing needs including path planning, sensor fusion, and the like, additional and/or disparate circuitry may be assembled to a traditional GPU. This fragmented and piecemeal approach to handling the additional perception processing needs of robotics and autonomous machines results in a number of inefficiencies in performing computations including inefficiencies in sensor signal processing.

Accordingly, there is a need in the integrated circuitry field for an advanced integrated circuit and processing techniques that are capable of high performance and real-time processing and computing of routine and advanced sensor signals for enabling perception of robotics or any type or kind of perceptual machine.

The inventors of the inventions described in the present application have designed an integrated circuit architecture and one or more processing techniques that allow for enhanced sensor data processing capabilities and have further discovered related methods for implementing the integrated circuit architecture for several purposes including for enabling perception of robotics and various machines.

BRIEF SUMMARY OF THE INVENTION(S)

In one embodiment, a method for implementing accelerated memory transfers in an integrated circuit includes identifying memory access parameters for configuring memory access instructions for accessing a target corpus of data from within a defined region of an n-dimensional memory; converting the memory access parameters to direct memory access (DMA) controller-executable instructions, wherein the converting includes: (i) defining dimensions of a data access tile based on a first parameter of the memory access parameters; (ii) generating multi-directional data accessing instructions that, when executed, automatically moves the data access tile along multiple distinct axes within the defined region of the n-dimensional memory based at least on a second parameter of the memory access parameters; transferring a corpus of data from the n-dimensional memory to a target memory based on executing the DMA controller-executable instructions.

In one embodiment, the method includes generating intra-data access tile data accessing instructions that inform a pattern for collecting lines of data within a body of the data access tile, wherein the intra-data access tile data accessing instructions include: a line-to-line movement instruction that informs a pattern of movement from an instant line of data within the data access tile at which an active collection of data is performed to a subsequent line of data within the body of the data access tile at which a subsequent collection of data will be performed, wherein the pattern of movement identifies a number of lines that are bypassed between the instant line of data and the sequent line of data.

In one embodiment, the intra-data access tile data accessing instructions further include: a looping instruction that informs a number of instances of execution of the line-to-line movement instruction for collecting a plurality of distinct lines of data within the data access tile.

In one embodiment, the multi-directional data accessing instructions include: a tile transposition instruction that informs a pattern of moving the data access tile along a second direction of the defined region of the n-dimensional memory based on a completion of a collection of data by the data access tile along a first direction of the defined region of the n-dimensional memory.

In one embodiment, the multi-directional data accessing instructions further include: a tile transposition looping instruction that informs a number of instances of execution of the tile transposition instruction for collecting, by the data access tile, a plurality of distinct tiles of data within the defined region of the n-dimensional memory.

In one embodiment, wherein executing the DMA controller-executable instructions includes: accessing data by moving the data access tile a predetermined number of times along a first direction within the defined region of the n-dimensional memory, and upon completion of the movement of the data access tile along the first direction, (a) automatically moving the data access tile in a second direction within the defined region of the n-dimensional memory and (b) restarting the accessing data along the first direction within the defined region based on moving the data access tile in the second direction.

In one embodiment, moving the data access tile in the second direction of the defined includes moving the data access tile to a location within the defined region that is nonoverlapping with a prior location within the defined region of the data access tile.

In one embodiment, generating multi-directional data accessing instructions includes: generating a sequence of base memory addresses, where each distinct base memory address of the sequence of base memory addresses is associated with a distinct iteration of the data access tile.

In one embodiment, the method includes configuring a direct memory access (DMA) mask based on identifying that an iteration of the data access tile will likely exceed a boundary of the defined region of the n-dimensional memory, wherein the DMA mask includes data access instructions that, when executed, generate predetermined data values along an extent of the data access tile that exceeds the boundary of the defined region.

In one embodiment, the method includes configuring exo-tile boundary data access instructions based on the memory access parameters requiring a collection of data that exceeds at least one boundary of the data access tile and encompasses the at least one boundary of the data access tile, wherein the exo-tile boundary data access instructions, when executed, causes a collection, by the data access tile, of data values encompassing the at least one boundary of the data access tile.

In one embodiment, the memory access parameters include: the first parameter that informs the dimensions of the defined region within the n-dimensional memory; and the second parameter that identifies a data access scheme of a plurality of distinct data access schemes that informs a creation of the multi-directional data accessing instructions.

In one embodiment, the memory access parameters further include: a third parameter that identifies a second direction for performing data access using the data access tile within the defined region that is distinct from a first direction for data access using the data access tile within the defined region.

In one embodiment, generating the multi-directional data accessing instructions includes generating transpositional DMA instructions that include: (i) a data access pattern that, when executed, implements a plurality of distinct executions of the data collection tile at a plurality of distinct base memory addresses along the defined region, and (ii) a transposition instruction that automatically moves the data collection tile from an instant base memory address to a subsequent base memory address of the plurality of distinct base memory addresses based on a completion of an accessing of data by the data accessing tile at the instant base memory address.

In one embodiment, generating the multi-directional data accessing instructions includes generating recycling DMA instructions that include: (i) a data access pattern that, when executed, implements an accessing of data by the data access tile at an instant base memory address of a sequence of base memory addresses within the defined region of the n-dimensional memory, and (ii) a recycle instruction that, when executed, automatically recycles the data collection tile at a distinct base memory address of the sequence of base memory addresses based on a completion of the accessing of data by the data accessing tile at the instant base memory address.

In one embodiment, the n-dimensional memory comprises an on-chip memory, and the target memory comprises a local memory of each of a plurality of processing cores.

In one embodiment, a method for accelerated data transfer in an integrated circuit that includes identifying, via a front-end application programming interface (API), a set of memory access parameters for transferring data between distinct memory components; converting, via an iterator API executing a software development kit, the set of memory access parameters to data fetching instructions executable by one or more circuits of an integrated circuit, wherein the converting includes: (i) defining a shape of a direct memory access (DMA) tile that, when executed, accesses data from within a defined region of interest of an n-dimensional memory; (ii) generating multi-directional DMA instructions that, when executed, iterates the DMA tile along multiple distinct axes within the defined region of interest of the n-dimensional memory for transferring a target corpus of data; and transferring the target corpus of data from an on-chip memory to a target memory based on executing the data fetching instructions.

In one embodiment, a system for accelerated data transfer in an integrated circuit includes a front-end application programming interface (API) that receives a set of memory access parameters for transferring data between distinct memory components; an iterator API executing a software development kit that converts, the set of memory access parameters to data fetching instructions executable by one or more circuits of an integrated circuit, wherein the converting includes: (i) defining a shape of a direct memory access (DMA) tile that, when executed, accesses data from within a defined region of interest of an n-dimensional memory; (ii) generating multi-directional DMA instructions that, when executed, iterates the DMA tile along multiple distinct axes within the defined region of interest of the n-dimensional memory for transferring a target corpus of data; and a DMA circuit that transfers the target corpus of data from an on-chip memory to a target memory based on executing the data fetching instructions.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. A System Architecture of a Dense Algorithm and/or Perception Processing Circuit (Unit)

Figure 1:
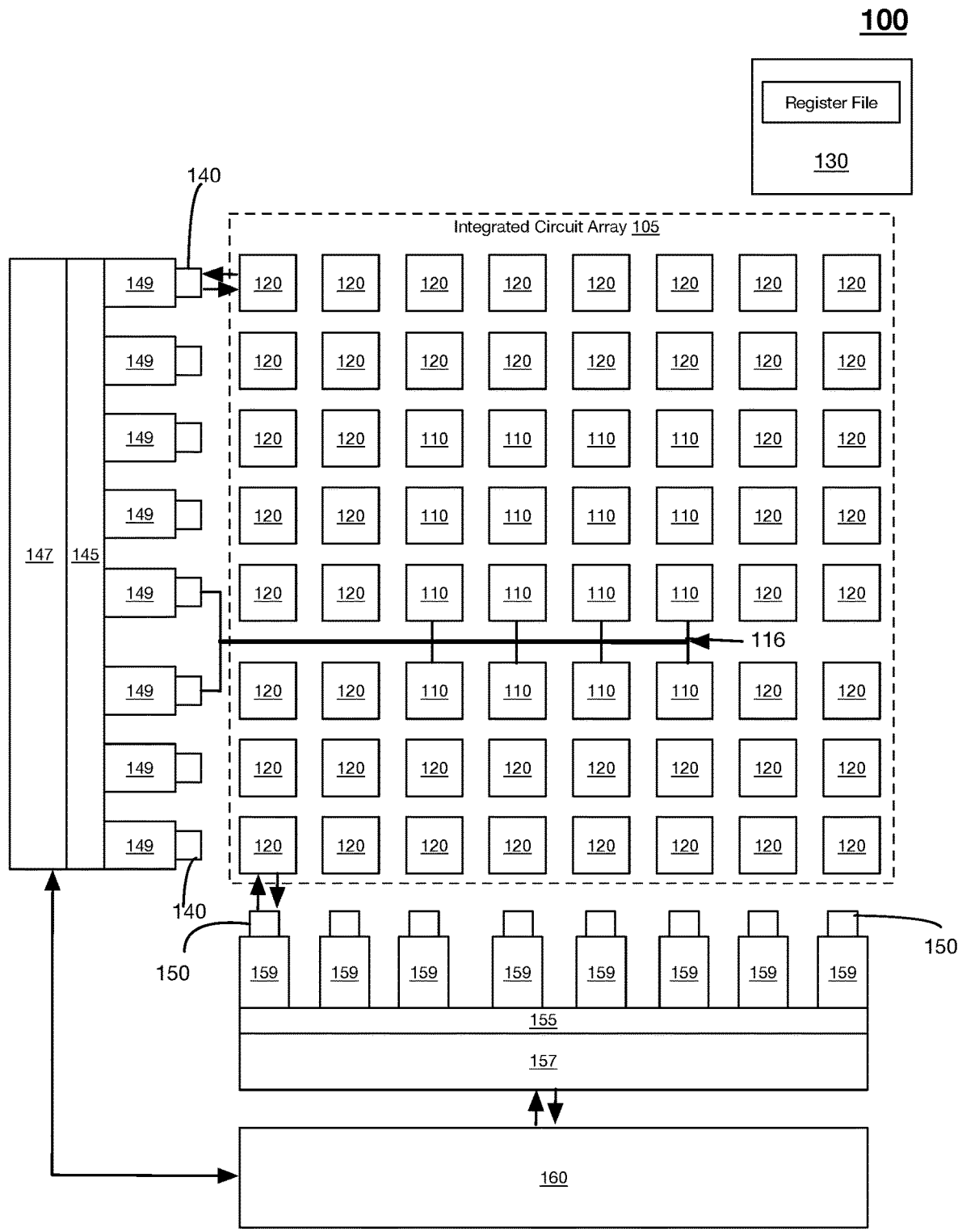
FIG. 1 is a schematic representation of the system 100 in accordance with one or more embodiments of the present application.

As shown in FIG. 1, the integrated circuit 100 (dense algorithm and/or perception processing unit) for performing perception processing includes a plurality of array cores 110, a plurality of border cores 120, a dispatcher (main controller) 130, a first plurality of periphery controllers 140, a second plurality of periphery controllers 150, and main memory 160. The integrated circuit 100 may additionally include a first periphery load store 145, a second periphery load store 155, a first periphery memory 147, a second periphery memory 157, a first plurality of dual FIFOs 149, and a second plurality of dual FIFOs 159, as described in U.S. Pat. Nos. 10,365,860, 10,691,464, and U.S. patent application Ser. No. 16/292,537, which are all incorporated herein in their entireties by this reference.

The integrated circuit 100 preferably functions to enable real-time and high computing efficiency of perception data and/or sensor data. A general configuration of the integrated circuit 100 includes a plurality of array core 110 defining central signal and data processing nodes each having large register files that may eliminate or significantly reduce clock cycles needed by an array core 110 for pulling and pushing data for processing from memory. The instructions (i.e., computation/execution and data movement instructions) generating capabilities of the integrated circuit 100 (e.g., via the dispatcher 130 and/or a compiler module 175) functions to enable a continuity and flow of data throughout the integrated circuit 100 and namely, within the plurality of array cores 110 and border cores 120.

An array core 110 preferably functions as a data or signal processing node (e.g., a small microprocessor) or processing circuit and preferably, includes a register file 112 having a large data storage capacity (e.g., 1024 kb, etc.) and an arithmetic logic unit (ALU) 118 or any suitable digital electronic circuit that performs arithmetic and bitwise operations on integer binary numbers. In a preferred embodiment, the register file 112 of an array core 110 may be the only memory element that the processing circuits of an array core no may have direct access to. An array core no may have indirect access to memory outside of the array core and/or the integrated circuit array 105 (i.e., core mesh) defined by the plurality of border cores 120 and the plurality of array cores no.

The register file 112 of an array core no may be any suitable memory element or device, but preferably comprises one or more static random-access memories (SRAMs). The register file 112 may include a large number of registers, such as 1024 registers, that enables the storage of a sufficiently large data set for processing by the array core no. Accordingly, a technical benefit achieved by an arrangement of the large register file 112 within each array core 110 is that the large register file 112 reduces a need by an array core no to fetch and load data into its register file 112 for processing. As a result, a number of clock cycles required by the array core 112 to push data into and pull data out of memory is significantly reduced or eliminated altogether. That is, the large register file 112 increases the efficiencies of computations performed by an array core 110 because most, if not all, of the data that the array core no is scheduled to process is located immediately next to the processing circuitry (e.g., one or more MACs, ALU, etc.) of the array core no. For instance, when implementing image processing by the integrated circuit 100 or related system using a neural network algorithm(s) or application(s) (e.g., convolutional neural network algorithms or the like), the large register file 112 of an array core may function to enable a storage of all the image data required for processing an entire image. Accordingly, most or if not, all layer data of a neural network implementation (or similar compute-intensive application) may be stored locally in the large register file 112 of an array core 110 with the exception of weights or coefficients of the neural network algorithm(s), in some embodiments. Accordingly, this allows for optimal utilization of the computing and/or processing elements (e.g., the one or more MACs and ALU) of an array core 110 by enabling an array core 110 to constantly churn data of the register file 112 and further, limiting the fetching and loading of data from an off-array core data source (e.g., main memory, periphery memory, etc.).

By comparison, to traverse a register file in a traditional system implemented by a GPU or the like, it is typically required that memory addresses be issued for fetching data from memory. However, in a preferred embodiment that implements the large register file 112, the (raw) input data within the register file 112 may be automatically incremented from the register file 112 and data from neighboring core(s) (e.g., array cores and/or border cores) are continuously sourced to the register file 112 to enable a continuous flow to the computing elements of the array core 110 without an express need to make a request (or issuing memory addresses) by the array core 110.

While in some embodiments of the present application, a predetermined data flow scheduled may mitigate or altogether, eliminate requests for data by components within the integrated circuit array 105, in a variant of these embodiments traditional random memory access may be achieved by components of the integrated circuit array 105. That is, if an array core 110 or a border core 120 recognizes a need for a random piece of data for processing, the array core 110 and/or the border 120 may make a specific request for data from any of the memory elements within the memory hierarchy of the integrated circuit 100.

An array core 110 may, additionally or alternatively, include a plurality of multiplier (multiply) accumulators (MACs) 114 or any suitable logic devices or digital circuits that may be capable of performing multiply and summation functions. In a preferred embodiment, each array core 110 includes four (4) MACs and each MAC 114 may be arranged at or near a specific side of a rectangular shaped array core 110. While, in a preferred embodiment each of the plurality of MACs 114 of an array core 110 may be arranged near or at the respective sides of the array core 110, it shall be known that the plurality of MACs 114 may be arranged within (or possibly augmented to a periphery of an array core) the array core 110 in any suitable arrangement, pattern, position, and the like including at the respective corners of an array core no. In a preferred embodiment, the arrangement of the plurality of MACs 114 along the sides of an array core 110 enables efficient inflow or capture of input data received from one or more of the direct neighboring cores (i.e., an adjacent neighboring core) and the computation thereof by the array core 110 of the integrated circuit 100.

Accordingly, each of the plurality of MACs 114 positioned within an array core 110 may function to have direct communication capabilities with neighboring cores (e.g., array cores, border cores, etc.) within the integrated circuit boo. The plurality of MACs 114 may additionally function to execute computations using data (e.g., operands) sourced from the large register file 112 of an array core 110. However, the plurality of MACs 114 preferably function to source data for executing computations from one or more of their respective neighboring core(s) and/or a weights or coefficients (constants) bus 116 that functions to transfer coefficient or weight inputs of one or more algorithms (including machine learning algorithms) from one or more memory elements (e.g., main memory 160 or the like) or one or more input sources.

The weights bus 116 may be operably placed in electrical communication with at least one or more of periphery controllers 140, 150 at a first input terminal and additionally, operably connected with one or more of the plurality of array core 110. In this way, the weight bus 116 may function to collect weights and coefficients data input from the one or more periphery controllers 140, 150 and transmit the weights and coefficients data input directly to one or more of the plurality of array cores 110. Accordingly, in some embodiments, multiple array cores no may be fed weights and/or coefficients data input via the weights bus 116 in parallel to thereby improve the speed of computation of the array cores 110.

Each array core 110 preferably functions to bi-directionally communicate with its direct neighbors. That is, in some embodiments, a respective array core 110 may be configured as a processing node having a rectangular shape and arranged such that each side of the processing node may be capable of interacting with another node (e.g., another processing node, a data storage/movement node, etc.) that is positioned next to one of the four sides or each of the faces of the array core no. The ability of an array core 110 to bi-directionally communicate with a neighboring core along each of its sides enables the array core no to pull in data from any of its neighbors as well as push (processed or raw) data to any of its neighbors. This enables a mesh communication architecture that allows for efficient movement of data throughout the collection of array and border cores 110, 120 of the integrated circuit 100.

Each of the plurality of border cores 120 preferably includes a register file 122. The register file 122 may be configured similar to the register file 112 of an array core 110 in that the register file 122 may function to store large datasets. Preferably, each border core 120 includes a simplified architecture when compared to an array core 110. Accordingly, a border core 120 in some embodiments may not include execution capabilities and therefore, may not include multiplier-accumulators and/or an arithmetic logic unit as provided in many of the array cores 110.

In a traditional integrated circuit (e.g., a GPU or the like), when input image data (or any other suitable sensor data) received for processing compute-intensive application (e.g., neural network algorithm) within such a circuit, it may be necessary to issue padding requests to areas within the circuit which do not include image values (e.g., pixel values) based on the input image data. That is, during image processing or the like, the traditional integrated circuit may function to perform image processing from a memory element that does not contain any image data value. In such instances, the traditional integrated circuit may function to request that a padding value, such as zero, be added to the memory element to avoid subsequent image processing efforts at the memory element without an image data value. A consequence of this typical image data processing by the traditional integrated circuit results in a number of clock cycles spent identifying the blank memory element and adding a computable value to the memory element for image processing or the like by the traditional integrated circuit.

In a preferred implementation of the integrated circuit 100, one or more of the plurality of border cores 120 may function to automatically set to a default value when no input data (e.g., input sensor data) is received. For instance, input image data from a sensor (or another circuit layer) may have a total image data size that does not occupy all border core cells of the integrated circuit array 105. In such instance, upon receipt of the input image data, the one or more border cores 120 (i.e., border core cells) without input image data may be automatically set to a default value, such as zero or a non-zero constant value.

In some embodiments, the predetermined input data flow schedule generated by the dispatcher and sent to one or more of the plurality of border cores may include instructions to set to a default or a predetermined constant value. Additionally, or alternatively, the one or more border cores 120 may be automatically set to a default or a predetermined value when it is detected that no input sensor data or the like is received with a predetermined input data flow to the integrated circuit array 105. Additionally, or alternatively, in one variation, the one or more border cores 120 may be automatically set to reflect values of one or more other border cores having input sensor data when it is detected that no input sensor data or the like is received with a predetermined input data flow to the integrated circuit array 105.

Accordingly, a technical benefit achieved according to the implementation of one or more of the plurality of border cores 120 as automatic padding elements, may include increasing efficiencies in computation by one or more of the plurality of array cores 110 by minimizing work requests to regions of interest (or surrounding areas) of input sensor data where automatic padding values have been set. Thereby, reducing clock cycles used by the plurality of array core no in performing computations on an input dataset.

In a preferred implementation of the integrated circuit 100, the progression of data into the plurality of array cores 110 and the plurality of border cores 120 for processing is preferably based on a predetermined data flow schedule generated at the dispatcher 130. The predetermined data flow schedule enables input data from one or more sources (e.g., sensors, other NN layers, an upstream device, etc.) to be loaded into the border cores 120 and array cores 110 without requiring an explicit request for the input data from the border cores 120 and/or array cores 110. That is, the predetermined data flow schedule enables an automatic flow of raw data from memory elements (e.g., main memory 160) of the integrated circuit 100 to the plurality of border cores 120 and the plurality of array cores 110 having capacity to accept data for processing. For instance, in the case that an array core no functions to process a first subset of data of a data load stored in its register file 112, once the results of the processing of the first subset of data is completed and sent out from the array core 110, the predetermined data flow schedule may function to enable an automatic flow of raw data into the array core no that adds to the data load at the register file 112 and replaces the first subset of data that was previously processed by the array core 110. Accordingly, in such instance, no explicit request for additional raw data for processing is required from the array core 110. Rather, the integrated circuit 100 implementing the dispatcher 130 may function to recognize that once the array core 110 has processed some amount of data sourced from its register file 112 (or elsewhere) that the array core 110 may have additional capacity to accept additional data for processing.

Figure 3:
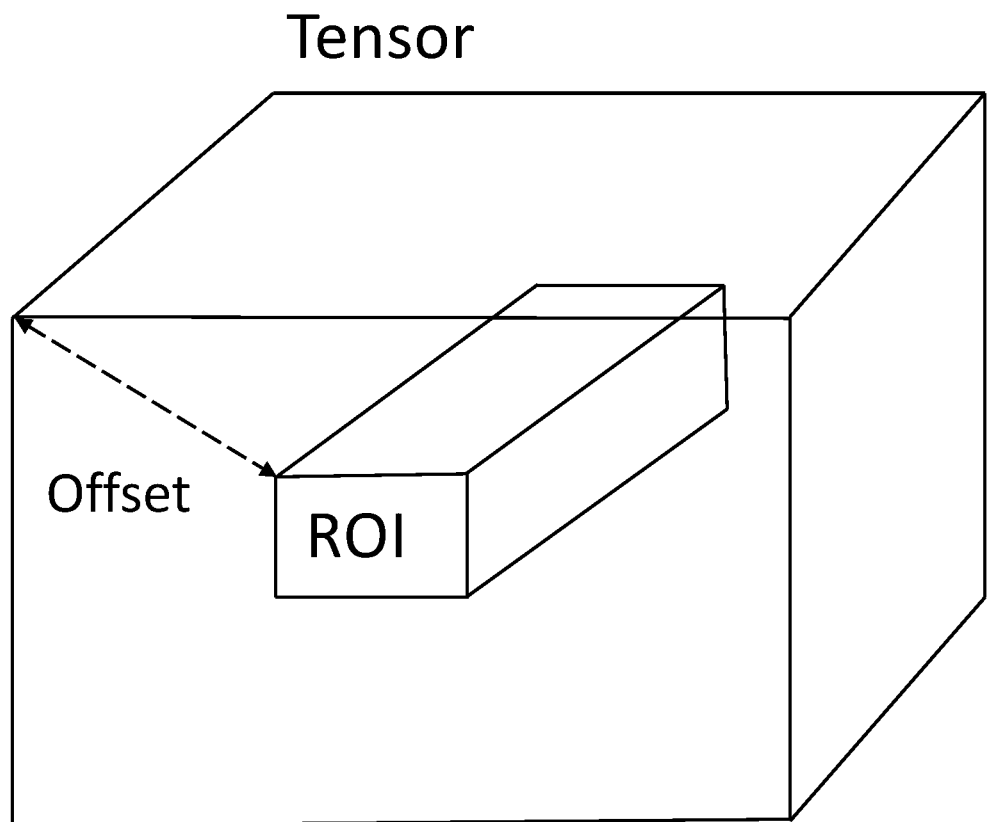
FIG. 3 illustrates an exemplary schematic showing an arrangement of an ROI in a tensor in accordance with one or more embodiments of the present application.

In a preferred embodiment, the integrated circuit 100 may be in operable communication with an instructions generator 170 that functions to generate computation, execution, and data movement instructions, as shown by way of example in FIG. 3A. The instructions generator 170 may be arranged off-chip relative to the components and circuitry of the integrated 100. However, in alternative embodiments, the instructions generator 170 may be cooperatively integrated within the integrated circuit 100 as a distinct or integrated component of the dispatcher 130.

Preferably, the instructions generator 170 may be implemented using one or more general purpose computers (e.g., a Mac computer, Linux computer, or any suitable hardware computer) or general purpose computer processing (GPCP) units 171 that function to operate a compiler module 175 that is specifically configured to generate multiple and/or disparate types of instructions. The compiler module 175 may be implemented using any suitable compiler software (e.g., a GNU Compiler Collection (GCC), a Clang compiler, and/or any suitable open source compiler or other compiler). The compiler module 175 may function to generate at least computation instructions and execution instructions as well as data movement instructions. In a preferred embodiment, at compile time, the compiler module 175 may be executed by the one or more GPCP units 171 to generate the two or more sets of instructions computation/execution instructions and data movement instructions sequentially or in parallel. In some embodiments, the compiler module 175 may function to synthesize multiple sets of disparate instructions into a single composition instruction set that may be loaded into memory (e.g., instructions buffer, an external DDR, SPI flash memory, or the like) from which the dispatcher may fetch the single composition instruction set from and execute.

In a first variation, however, once the compiler module 175 generates the multiple disparate sets of instructions, such as computation instructions and data movement instructions, the instructions generator 170 may function to load the instructions sets into a memory (e.g., memory 160 or off-chip memory associated with the generator 170). In such embodiments, the dispatcher 130 may function to fetch the multiple sets of disparate instructions generated by the instructions generator 170 from memory and synthesize the multiple sets of disparate instructions into a single composition instruction set that the dispatcher may execute and/or load within the integrated circuit 100.

In a second variation, the dispatcher 130 may be configured with compiling functionality to generate the single composition instruction set. In such variation, the dispatcher 130 may include processing circuitry (e.g., microprocessor or the like) that function to create instructions that include scheduled computations or executions to be performed by various circuits and/or components (e.g., array core computations) of the integrated circuit 100 and further, create instructions that enable a control a flow of input data through the integrated circuit 100. In some embodiments, the dispatcher 130 may function to execute part of the instructions and load another part of the instructions into the integrated circuit array 105. In general, the dispatcher 130 may function as a primary controller of the integrated circuit 100 that controls and manages access to a flow (movement) of data from memory to the one or more other storage and/or processing circuits of the integrated circuit 100 (and vice versa). Additionally, the dispatcher 130 may schedule control execution operations of the various sub-controllers (e.g., periphery controllers, etc.) and the plurality of array cores 110.

In some embodiments, the processing circuitry of the dispatcher 130 includes disparate circuitry including a compute instruction generator circuit 132 and a data movement instructions generator circuit 134 (e.g., address generation unit or address computation unit) that may independently generate computation/execution instructions and data transfers/movements schedules or instructions, respectively. Accordingly, this configuration enables the dispatcher 130 to perform data address calculation and generation of computation/execution instructions in parallel. The dispatcher 130 may function to synthesize the output from both the computer instructions generator circuit 132 and the data movement instructions generator circuit 134 into a single instructions composition that combines the disparate outputs.

The single instructions composition generated by the instructions generator 170 and/or the dispatcher 130 may be provided to the one or more downstream components and integrated circuit array 105 and allow for computation or processing instructions and data transfer/movement instructions to be performed simultaneously by these various circuits or components of the integrated circuit 100. With respect to the integrated circuit array 105, the data movement component of the single instructions composition may be performed by one or more of periphery controllers 140, 150 and compute instructions by one or more of the plurality of array cores no. Accordingly, in such embodiment, the periphery controllers 140, 150 may function to decode the data movement component of the instructions and if involved, may perform operations to read from or write to the dual FIFOs 149, 159 and move that data from the dual FIFOs 149, 159 onto a data bus to the integrated circuit (or vice versa). It shall be understood that the read or write operations performed by periphery controllers 140, 150 may performed sequentially or simultaneously (i.e., writing to and reading from dual FIFOs at the same time).

It shall be noted that while the compute instructions generator circuit 132 and the data movement instructions generator circuit 134 are preferably separate or independent circuits, in some embodiments the compute instructions generator circuit 132 and the data movement instructions generator circuit 134 may be implemented by a single circuit or a single module that functions to perform both compute instructions generation and data movement instruction generation.

In operation, the dispatcher 130 may function to generate and schedule memory addresses to be loaded into one or more the periphery load store 145 and the periphery load store 155. The periphery load stores 145, 155 preferably include specialized execution units that function to execute all load and store instructions from the dispatcher 130 and may generally function to load or fetch data from memory or storing the data back to memory from the integrated array core. The first periphery load store 145 preferably communicably and operably interfaces with both the first plurality of dual FIFOs 149 and the first periphery memory 147. The first and the second periphery memory 147, 157 preferably comprise on-chip static random-access memory.

In configuration, the first periphery load store 145 may be arranged between the first plurality of dual FIFOs 149 and the first periphery memory 147 such that the first periphery load store 145 is positioned immediately next to or behind the first plurality of dual FIFOs 149. Similarly, the second periphery load store 155 preferably communicably and operably interfaces with both the second plurality of dual FIFOs 159 and the second periphery memory 157. Accordingly, the second periphery load store 155 may be arranged between the second plurality of dual FIFOs 159 and the second periphery memory 157 such that the second periphery load store 155 is positioned immediately next to or behind the second plurality of dual FIFOs 159.

In response to memory addressing instructions issued by the dispatcher 130 to one or more of the first and the second periphery load stores 145, 155, the first and the second periphery load stores 145, 155 may function to execute the instructions to fetch data from one of the first periphery memory 147 and the second periphery memory 157 and move the fetched data into one or more of the first and second plurality of dual FIFOs 149, 159. Additionally, or alternatively, the dual FIFOs 149, 159 may function to read data from a data bus and move the read data to one or more of the respective dual FIFOs or read data from one or more of the dual FIFOs and move the read data to a data bus. Similarly, memory addressing instructions may cause one or more of the first and the second periphery load stores 145, 155 to move data collected from one or more of the plurality of dual FIFOs 149, 159 into one of the first and second periphery memory 147, 157.

Each of the first plurality of dual FIFOs 149 and each of the second plurality of dual FIFOs 159 preferably comprises at least two memory elements (not shown). Preferably, the first plurality of dual FIFOs 149 may be arranged along a first side of the integrated circuit array 105 with each of the first plurality of dual FIFOs 149 being aligned with a row of the integrated circuit array 105. Similarly, the second plurality of dual FIFOs 159 may be arranged along a second side of the integrated circuit array 105 with each of the second plurality of dual FIFOs 159 being aligned with a column of the integrated circuit array 105. This arrangement preferably enables each border 120 along the first side of the integrated circuit array 105 to communicably and operably interface with at least one of the first periphery controllers 145 and each border 120 along the second side of the integrated circuit array 105 to communicably and operably interface with at least one of the second periphery controllers 155.

While it is illustrated in at least FIG. 1 that there are a first and second plurality of dual FIFOs, first and second periphery controllers, first and second periphery memories, and first and second load stores, it shall be noted that these structures may be arranged to surround an entire periphery of the integrated circuit array 105 such that, for instance, these components are arranged along all (four) sides of the integrated circuit array 105.

The dual FIFOs 149, 159 preferably function to react to specific instructions for data from their respective side. That is, the dual FIFOs 149, 159 may be configured to identify data movement instructions from the dispatcher 130 that is specific to either the first plurality of dual FIFOs 149 along the first side or the second plurality of dual FIFOs along the second side of the integrated circuit array 105.

According to a first implementation, each of the dual FIFOs may use first of the two memory elements to push data into the integrated circuit array 105 and second of the two memory elements to pull data from the integrated circuit array 105. Thus, each dual FIFO 149, 159 may have a first memory element dedicated for moving data inward into the integrated circuit array 105 and a second memory element dedicated for moving data outward from the integrated circuit array 105.

According to a second implementation, the dual FIFOs may be operated in a stack (second) mode in which each respective dual FIFO functions to provide data into the integrated circuit array 105 in a predetermined sequence or order and collect the data from the integrated circuit array 105 in the same predetermined sequence or order.

Additionally, the integrated circuit 100 preferably includes main memory 160 comprising a single unified memory. The main memory 160 preferably functions to store data originating from one or more sensors, system-derived or generated data, data from one or more integrated circuit layers, data from one or more upstream devices or components, and the like. Preferably, the main memory 160 comprises on-chip static random-access memory or the like.

Additionally, or alternatively, main memory 160 may include multiple levels of on-die (on-chip) memory. In such embodiments, the main memory 160 may include multiple memory (e.g., SRAM) elements that may be in electrical communication with each other and function as a single unified memory that is arranged on a same die as the integrated circuit array 105.

Additionally, or alternatively, main memory 160 may include multiple levels of off-die (off-chip) memory (not shown). In such embodiments, the main memory 160 may include multiple memory (e.g., DDR SRAM, high bandwidth memory (HBM), etc.) elements that may be in electrical communication with each other and function as a single unified memory that is arranged on a separate die than the integrated circuit array.

It shall be noted that in some embodiments, the integrated circuit 100 includes main memory 160 comprising memory arranged on-die and off-die. In such embodiments, the on-die and the off-die memory of the main memory 160 may function as a single unified memory accessible to the on-die components of the integrated circuit 100.

Each of the first periphery memory 147 and the second periphery memory 157 may port into the main memory 160. Between the first periphery memory 147 and the main memory 160 may be arranged a load store unit that enables the first periphery memory 147 to fetch data from the main memory 160. Similarly, between the second periphery memory 157 and the main memory 160 may be arranged a second load store unit that enables the second periphery memory 157 to fetch data from the main memory 160.

It shall be noted that the data transfers along the memory hierarchy of the integrated circuit 100 occurring between dual FIFOs 149, 159 and the load stores 145, 155, between the load stores 145, 155 and the periphery memory 147, 157, and the periphery memory 147, 157 and the main memory 160 may preferably be implemented as prescheduled or predetermined direct memory access (DMA) transfers that enable the memory elements and load stores to independently access and transfer data within the memory hierarchy without direct invention of the dispatcher 130 or some main processing circuit. Additionally, the data transfers within the memory hierarchy of the integrated circuit 100 may be implemented as 2D DMA transfers having two counts and two strides thereby allowing for efficient data access and data reshaping during transfers. In a preferred embodiment, the DMA data transfers may be triggered by a status or operation of one or more of the plurality of array cores no. For instance, if an array core is completing or has completed a processing of first set of data, the completion or near-completion may trigger the DMA transfers to enable additional data to enter the integrated circuit array 105 for processing.

2. Method for Intelligent Memory Transfers in an Integrated Circuit

Figure 2:
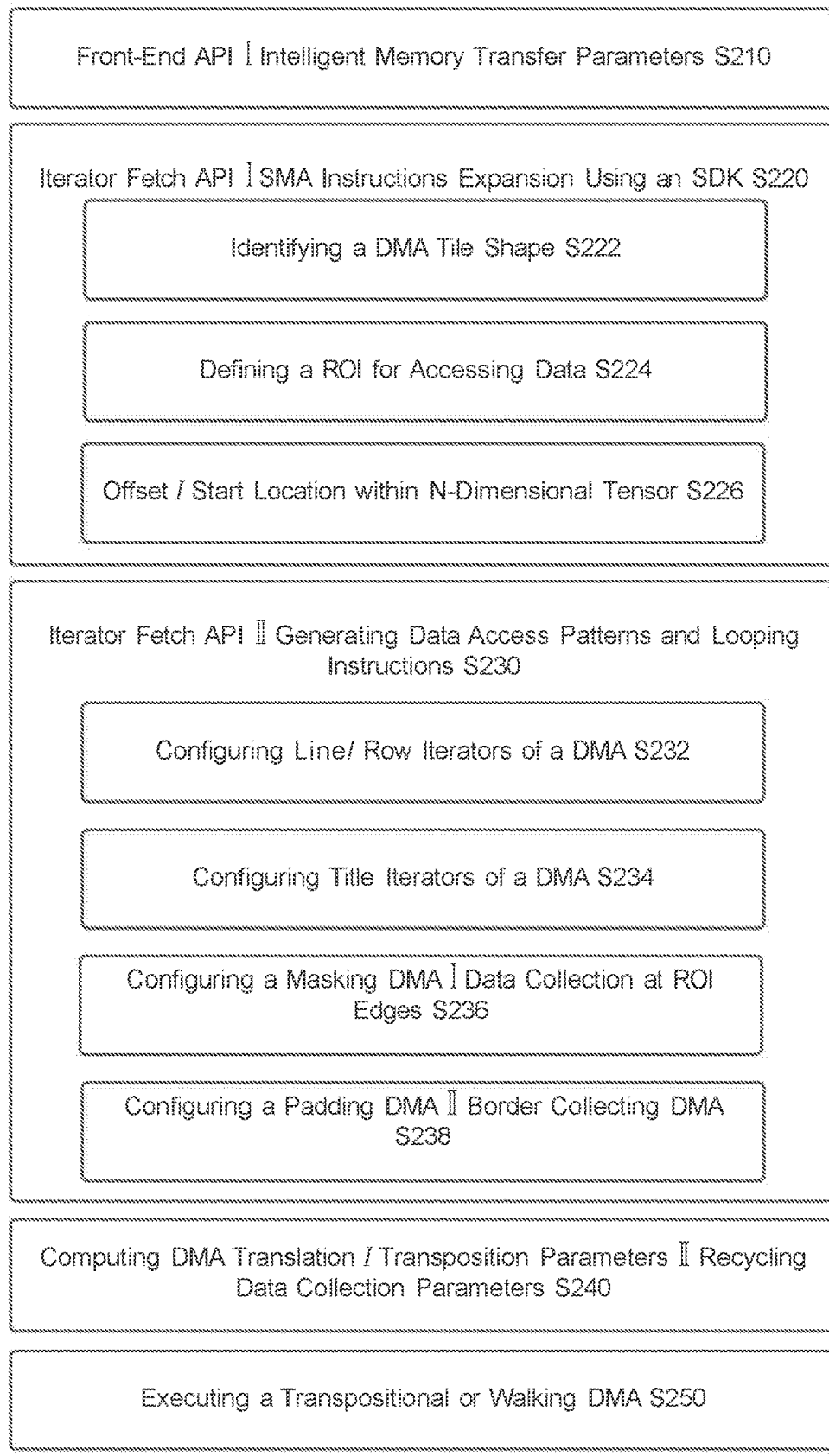
FIG. 2 illustrates a method for configuring and/or implementing intelligent memory transfers in accordance with one or more embodiments of the present application.

As shown by way of example in FIG. 2, a method 200 for implementing intelligent memory transfers in an integrated circuit includes identifying memory transfer parameters for configuring one or more memory transfers or memory accesses S210, computing data fetching parameters or instructions S220, computing a data access or data collection pattern and iteration instructions for executing a direct memory access (DMA) S230, configuring transpositional data collection parameters or instructions S240, and executing one or more intelligent direct memory transfers or accesses S250.

2.10 Front-End API|Intelligent Memory Transfer Parameter Input

S210, which includes identifying memory transfer parameters for configuring one or more memory transfers or memory accesses, may function to receive, via a front-end application programming interface (API) or similar memory transfer configuration interface, a set of memory access and/or data transfer parameters or input for defining intelligent data fetching instructions, such as data transfer instructions for transferring data between memory elements (e.g., between an on-chip memory (OCM) and local memory or registers of an array of processing cores, etc.) involving an integrated circuit. In one or more embodiments, the front-end API may interface with a client or the like that enables a user or other integrated circuit developer to provide input and/or intelligent memory transfer parameters to a system implementing an intelligent compiler or the like. In one or more preferred embodiments, the front-end API may operably interface with a back-end interface, such as an iterator API, as described in S220, that consumes input or memory transfer parameters from the front-end API and converts the memory transfer parameters to memory transfer instructions and/or commands executable by a target integrated circuit (e.g., via a DMA controller circuit or engine) for performing one or more memory transfers, memory accesses, and/or data fetching.

In a preferred embodiment, S210 may function to receive an API request (i.e., API call) that includes inputs of one or more memory transfer parameters for configuring one or more direct memory accesses (DMAs) for transferring data between two or more memories. In such preferred embodiment, the memory transfer parameters may include parameters for defining a memory access pattern or memory access scheme for accessing data within an n-dimensional (memory) data object within a larger memory, such as an n-dimensional tensor or the like stored on an external memory or an on-chip main memory.

In at least one embodiment, the memory transfer parameters may include an iterator type or a directional parameter that may function to set a primary direction (e.g., a first axis direction: height, width, depth/channel, etc.) for implementing a DMA for accessing data along a region of interest within an n-dimensional tensor or the like.

Additionally, or alternatively, in some embodiments, memory transfer parameters may include one or more parameters for defining or configuring an atypical DMA (instruction set) that may be recycled or reused and transposed for accessing data throughout a region of interest of an n-dimensional tensor or the like. The atypical DMA may sometimes be referred to herein as one or more of a "transpositional DMA", a "translational DMA", a "recycled DMA", a "walking DMA". In such embodiments, the one or more parameters for setting and/or configuring a transpositional DMA may include one or more of setting or identifying an iterator type and/or identifying a value for a secondary axis or a secondary direction to which a defined shape of a DMA may be automatically transposed and automatically re-initialized for a continuance of data accessing without an intervention of a central processing circuit thereby extending a use of the DMA beyond an initial data accessing scope or beyond a single use of the DMA from a base address and/or a primary axis of data access. That is, in the place of defining multiple DMAs for accessing multiple distinct sections or blocks of data within a region of interest, a transpositional DMA may be defined or selected that may function to recycle a data access iteration pattern and/or instructions used in accessing a prior block of data to then access one or more distinct, subsequent blocks or corpora of data initialized at multiple distinct base addresses or locations within a region of interest of an n-dimensional tensor and preferably, without a use of or intervention by a central processing unit (CPU) for computing subsequent base addresses for the recycled use of the DMA. At least one technical advantage of a transpositional DMA includes a reduced or eliminated requirement to interrupt and/or implement a CPU to create and/or initialize additional or new DMAs (e.g., saved clock cycles and improve transfer speed/ efficiency of the integrated circuit) for accessing all data required for processing and also, a reduced reliance on a DMA engine in the identification, scheduling, and/or implementing of additional or new DMAs.

It shall be recognized that the front-end API for configuring DMAs and the like may be implemented with and/or using any suitable user interface including web-accessible interfaces.

In a preferred embodiment, API instructions for configuring memory accesses and/or memory transfers may include a first memory transfer parameter relating to or that defines a shape of a region of interest (ROI) within an n-dimensional data object that defines an extent or area within an n-dimensional memory or object in which requested or required data should be accessed. In such preferred embodiment, the n-dimensional data object comprises an n-dimensional tensor. In some embodiments, a designated or instructed ROI shape may include a sub-region or a partition of an n-dimensional tensor or the like that may be a region lesser than a full extent of the n-dimensional tensor. In some embodiments, an ROI shape may include a region that encompasses an entirety of the n-dimensional tensor. That is, the ROI shape may have the same shape and extent of the n-dimensional tensor.

In one or more embodiments, a designated ROI shape may be any two-dimensional shape (e.g., a square) up to an n-dimensional shape (e.g., a cube, a tesseract, etc.). In some embodiments, a location of the ROI shape may be specified as one or more n-dimensional vectors, in which each n-dimensional vector points to or contains a corresponding height, width, depth/channel, and/or other length or point dimension of the ROI shape. Additionally, or alternatively, a designated ROI shape may include a plurality of distinct ROI shapes within at least one n-dimensional memory.

In a preferred embodiment, the API instructions may further include a second memory transfer parameter defining or selecting an iterator type of a plurality of distinct iterator types that preferably relates to a manner or scheme in which data may be fetched within a target ROI. In one or more embodiments, an axis direction(s) or tensor dimensional direction to move or iterate a DMA shape along a target ROI within the n-dimensional tensor may be provided or identified as a part of the second memory transfer parameter. In some embodiments, an axis direction (e.g., zy, xy, etc.) of movement of a DMA shape may be implicit based on an identification or selection of an iterator type.

In a preferred embodiment, a first iterator type may include a line or row iterator that may function to collect distinct lines or rows of data within an iterator/DMA shape or DMA tile shape. In such preferred embodiment, a given iterator shape or DMA tile may include or encompass multiple rows or lines of data through which the line or row iterator may selectively collect some of the rows by automatically looping a data collection scheme through the DMA tile. It shall be noted that while the first iterator type may preferably include a line or row iterator, the first iterator type may alternatively include a column iterator that selectively collects some (or all) columns of a DMA tile by looping a data collection scheme through the DMA tile.

Further, in such preferred embodiment, a second iterator type may include a tile iterator that may function to collect a tile's worth of data (e.g., a collection of lines of data accessed within a shape of a tile) along a dimensional extent of a tensor. In such preferred embodiment, the tile iterator may function to selectively collect one or more tiles of data along a dimensional extent of a tensor based on a data access pattern and looping scheme. In one or more embodiments, an iterator type may include a transpositional iterator type that re-cycles and/or transposes a DMA to one or more new base addresses for multiple uses for accessing data within an ROI. In such embodiments, an identification or selection of a transpositional iterator type may cause an automatic computation, at compile time (or at runtime), of multiple distinct base addresses or a sequence of base addresses for initializing or starting multiple, distinct iterations of the transpositional DMA within a given tensor.

Additionally, or alternatively, API instructions for configuring memory accesses and/or memory transfers may include a third memory transfer parameter that defines or identifies a direction from which data may be fetched into a processing circuit. In some embodiments, an integrated circuit comprising an array of processing cores or circuits may function to receive data for processing from multiple directions. Accordingly, API instructions may define from which direction (e.g., North, South, East, West) data that is fetched from an OCM or the like should be transferred into the array of processing cores.

In a preferred embodiment, the API instructions may further include a fourth memory transfer parameter relating to a data type of the n-dimensional tensor. For instance, in some embodiments, the third memory transfer parameter may function to identify a data type of the n-dimensional tensor as one of Int8, Int16, Int32, Int64, and/or the like.

In a preferred embodiment, API instructions for configuring memory accesses and/or memory transfers may include a fifth memory transfer parameter relating to an offset location or an intra-n-dimensional tensor location of an ROI for executing one or more direct memory accesses therein. In such embodiments, the ROI may be located inside of a tensor within an on-chip memory (OCM) of an integrated circuit and the intra-tensor location of the ROI relates to an offset from the tensor's base address, as shown by way of example by FIG. 3. In such preferred embodiment, a starting location or a base address of a DMA operating with the ROI may include or may be informed by an n-dimensional point within the ROI, which may correspond to, in some embodiments, the offset location of the ROI. In the circumstances in which the DMA includes a designated shape, such as an n×n tile or the like (e.g., a DMA tile shape), a starting location or base address may define a point along the shape of a first iteration the DMA tile (e.g., top left corner of a DMA tile or the like).

Additionally, or alternatively, API instructions for configuring memory accesses and/or memory transfers may include a location of a tensor within an on-chip memory and one or more of an identification of a location in local memory for storing data that may be fetched from a tensor within an on-chip memory.

2.20 Iterator Fetch API|DMA Instructions Expansion Using an SDK

S220, which includes computing data fetching instructions or commands based on front-end API parameters, may function to generate data fetching instructions based on one or more memory transfer parameters. In a preferred embodiment, S220 may function to implement a back-end data fetching API (e.g., an iterator data fetch API) that may interface with a front-end API to build data fetching instructions. In such preferred embodiment, the back-end data fetching API may additionally, or alternatively reference or use an intelligent software development kit (SDK) that optimizes the creation of the data fetching instructions based on one or more attributes of a subject integrated circuit, an n-dimensional data object, and an application or an algorithm operating or executing on the subject integrated circuit.

Preferably, S220 implementing the back-end data fetch API may function to use one or more tools of the SDK to create specific memory transfer instructions including, but not limited to, a creation of instructions or parameters for implementing one or more DMAs and associated scheduling instructions. That is, S220 implementing the iterator fetch API together with the SDK may function to create the executable instructions for each DMA based on memory transfer parameters obtained via the front-end API.

Additionally, or alternatively, S220 may function to implement a compiler program, data collection optimization program, and/or the like that may function to perform a static (e.g., compile time) evaluation of the memory transfer parameters for target data collection. Additionally, or alternatively, S220 may function to provide one or more computations (e.g., offset locations, ROI dimensions, base addresses, etc.) for configuring multiple distinct parameters for an intelligent implementation of each DMA.

2.22 Identifying a DMA Tile Shape

S220 includes S222, which includes identifying a tile shape, may function to compute a DMA tile shape that may be used in defining an area or a partition of a region of interest at which an active collection of data may be performed during one or more iterations of a DMA. In one or more embodiments, the DMA tile shape may generally represent a maximum amount of data that may be transferred into a processing region of an integrated circuit for processing by an array of processing elements. In such embodiments, computing the DMA tile shape may be informed by an aggregate of storage capacities (e.g., local storage) of the array of processing elements such that an extent of the DMA tile shape may match or may not exceed the maximum amount of data that may be handled by the array of processing elements at a given time.

Additionally, or alternatively, in some embodiments, a computation of a DMA tile shape may be informed by or based on attributes of a processing region of a given integrated circuit. For example, a processing region comprising an array of processing cores in a 4×4 (height in processors× width in processors) arrangement may inform a computation of a DMA tile shape that may be 4×4 (height×width). That is, in such example, a general two-dimensional shape (e.g., n×n) of a DMA tile shape may be computed to share a same or similar height and width dimension of an array of processing cores.

2.24 Defining a ROI for Accessing Data

S220 includes S224, which includes defining a region of interest, may function to configure and/or set the ROI within an n-dimensional tensor based at least on an ROI shape parameter of the one or more memory transfer parameters. An ROI, as defined by the back-end API and SDK, may be represented as an n-dimensional tensor (e.g., 3D shape, 4D shape, etc.) that may include a collection of data on an OCM. In some embodiments, an ROI may have a shape or size that may be equal to or smaller than a target OCM tensor. That is, a dimensionality of an ROI and the OCM tensor in which the ROI may be located may be consistent. Additionally, or alternatively, a starting location of an ROI with a target OCM tensor may be defined according to ROI offset parameters, as defined by example in S222. In a preferred embodiment, an ROI may function to define the only corpus of input data that may need to be fetched for processing or the like according to a given front-end API request.

2.26 Offset/Start Location w/in N-Dimensional Tensor

In one or more embodiments, S220 includes S226, which includes computing an offset location for a target region of interest (i.e., ROI offset). In such embodiments, the ROI offset preferably identifies a position or a location of the target ROI within an OCM tensor.

In some embodiments, an ROI offset location may additionally, or alternatively function as an initial or starting base address or base offset of a DMA. In such embodiments, a first iteration of a DMA may be initialized at the ROI offset/base address for starting a data collection or memory transfer from the offset position.

2.30 Iterator Fetch API∥Generating Data Access Patterns and Looping Instructions S230, which includes computing a data access or data collection pattern and looping (i.e., iterator) instructions for executing a DMA, may function to compute a set of DMA instructions that inform a manner in which data may be fetched within a given DMA tile shape and by moving the given DMA tile shape along one or more dimensions of a region of interest in a plurality of iterations.

S2.32 Configuring Line/Row Iterators of a DMA

S230 includes S232, which includes computing an intra-tile data collection scheme, may function to compute first or intra-DMA tile shape data access pattern parameters (e.g., line iterators or line iterator instructions) for collecting lines or rows of data within a DMA tile shape. In one or more embodiments, S232 implementing the iterator data fetch API may function to identify a number of lines available within a target data collection tile and generate data collection parameters for collecting a subset of or all the lines available with the target data collection tile based on one or more of an input of memory transfer parameters (via the front-end API).

Figure 4:
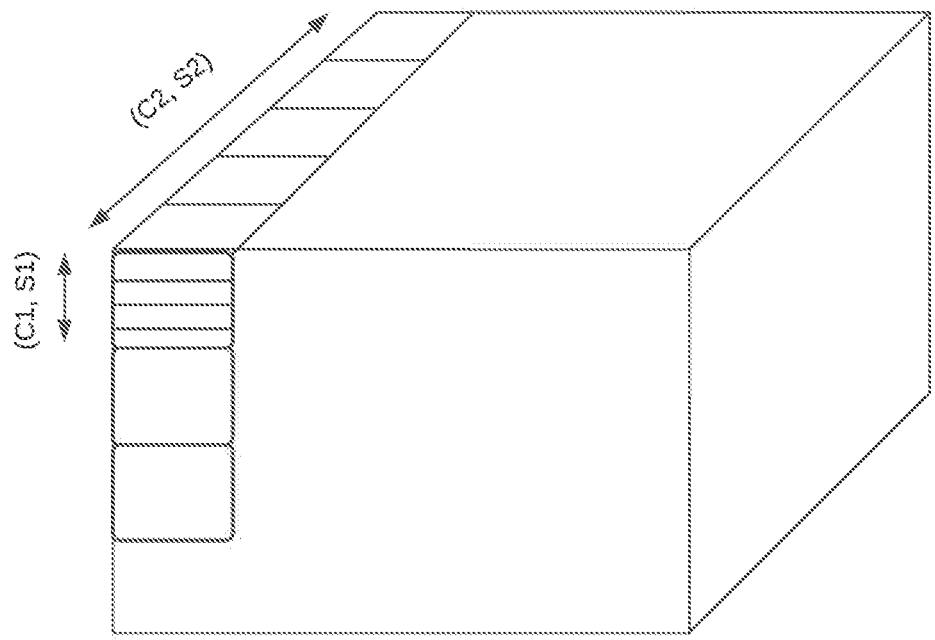
FIG. 4 illustrates an exemplary schematic demonstrating data access patterns for collecting data in accordance with one or more embodiments of the present application.

In some embodiments, the first data access pattern may be referred to herein as a line or row iterator since lines or rows of data may be accessed in an iterative fashion within a given DMA tile shape, as shown by way of example in FIG. 4. In one or more embodiments, the first data access pattern may include a line stride pattern (S1) or a line iteration movement instruction that identifies a number of lines/rows between each iteration of a collection of data along a line/row within the given DMA tile shape. For instance, in some embodiments, a stride pattern may be set to one "1" or a similar value that indicates data collection within a DMA tile shape should be performed every 1 line; that is, data collection within the DMA tile is performed at every line or row within the DMA tile and no line or row of data within the DMA tile shape is skipped or jumped over. In another example, in some embodiments, a line stride pattern may be set to an integer value greater than 1 (e.g., 2, 3, 4, etc.), such that one or more lines or rows of data within the DMA tile shape may be skipped before a data collection of subject line or row may be executed. In this example, a line stride value may be set to 3 such that every other third line of data within the DMA tile shape may be collected.

Additionally, or alternatively, in one or more embodiments, the first data access pattern may include a line count value (C1) or looping value that instructs a number of times that the line stride pattern or movement instruction should be executed within a given DMA tile shape. Stated differently, the line count value may function to loop a collection of a line/row of data within the DMA tile shape and at each iteration or loop, the line/row data collection may be moved along the DMA tile shape based on the line stride value before starting or executing a new or subsequent iteration of line/row data collection.

S2.34 Configuring Tile Iterators of a DMA

S230 includes S234, which includes computing a tile-based data collection scheme, may function to compute tile-based (e.g., DMA tile shape) data access pattern parameters or instructions (e.g., tile iterators or tile iterator instructions) for collecting tiles of data along a region of interest or the like within an n-dimensional data object. In one or more embodiments, S234 implementing the iterator data fetch API may function to identify a number of tiles that may be required for collecting a requested corpus of data from an n-dimensional data object and generate data collection parameters for collecting the corpus of data based on the required number of tiles. In such embodiments, S234 may function to iterate a given DMA tile a plurality of instances equaling the required number of tiles, which may be sufficient for collecting the corpus of data.

In one or more embodiments, S234 may function to compute parameters for a second data access pattern that may function to govern a movement of a given DMA tile shape along a dimensional direction of a region of interest for collecting data. In some embodiments, the second data access pattern may be referred to herein as a tile or a DMA tile iterator since a tile of data (i.e., multiple lines of data within a given boundary) may be accessed in an iterative fashion along a given dimensional direction of an n-dimensional data object.

Additionally, or alternatively, the second data access pattern may include a tile stride pattern (S2) or a tile iteration movement instruction that identifies a number of tile depths or tile dimensions between each iteration of a collection of a tile of data within a given n-dimensional data object. In one example, in some embodiments, a tile stride pattern (S2) may be set to "1" or a similar value that indicates data collection with an n-dimensional data object should be performed every 1 tile dimension (e.g., zy, xy, etc.) in a given direction with the n-dimensional data object. Stated differently, data collection by a DMA tile may be performed at every 1 potential tile position along a given dimensional direction of an n-dimensional data object such that no tile of data is skipped or jumped over during a data collection. In another example, in some embodiments, a tile stride pattern may be set or defined to an integer value greater than 1, such that one or more tiles of data within an n-dimensional data object may be skipped or jumped over before a data collection within an area of or encompassed by the tile may be executed. In such example, a tile stride value may be set to 4 such that every other $4^{th}$ position of a tile along a given dimension of an n-dimensional data object may be collected using the DMA tile.

Additionally, or alternatively, in one or more embodiments, the second data access pattern may include a count value (C2) or a looping instruction (parameter) that may instruct a number of times that the tile stride pattern (S1) or tile movement instruction should be repeated or executed for moving a DMA tile along a given dimension of an n-dimensional data object. That is, the tile count value may function to loop a collection of a tile of data at a new position within the n-dimensional data object and at each iteration or loop, the DMA tile may be moved along the dimension of the n-dimensional data object at predetermined distances based on the tile stride value before starting or executing a new or subsequent iteration of a collection of a tile of data.

Additionally, or alternatively, the line stride pattern and the line count value (C1, S1) of the first data access pattern and the tile stride pattern and the tile count value of the second data access pattern may together define a data access or collection pattern [(C1, S1), (C2, S2)] of a single DMA. Accordingly, S234 implementing the iterator fetch API may function to create constituent for loops with a data access pattern that may govern a direct memory access.

2.36 Configuring a Masking DMA|Data Collection at ROI Edges

Figure 6:
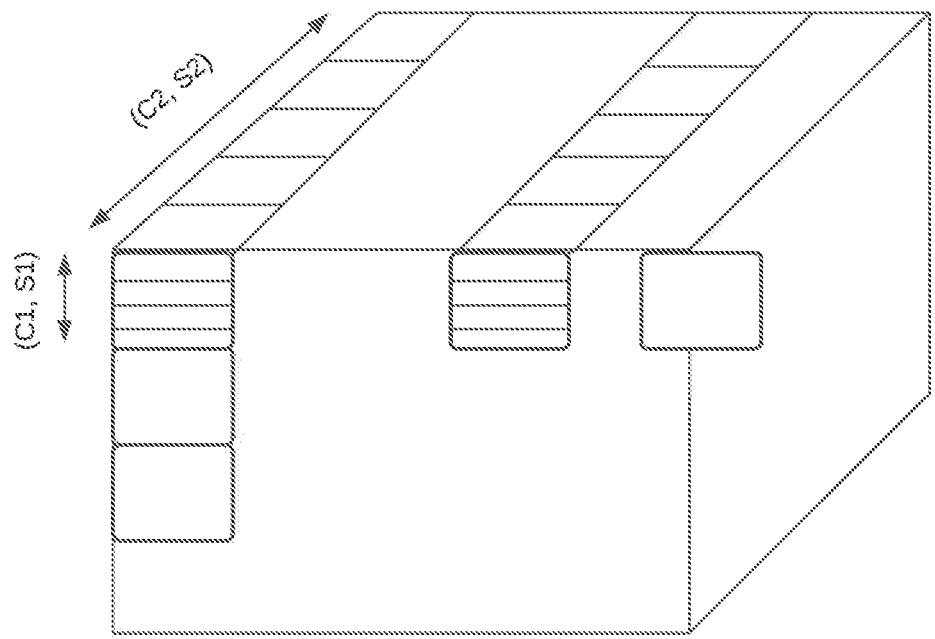
FIG. 6 illustrates an exemplary schematic demonstrating a circumstance involving a DMA tile exceeding an extent of an ROI in accordance with one or more embodiments of the present application.

S230 optionally includes S236, which includes configuring one or more data collection tiles having masking values, may function to identify one or more instances in which dimensions or a shape of a data collection tile may partially exceed an extent or an edge (boundary) of a region of interest, as shown by way of example in FIG. 6. In such embodiments, S236 may function to compute data collection instructions, preferably in a form of a masking DMA, that includes or provides masking data values along an extent of the DMA tile shape that exceeds the ROI. In this way, while a part of a DMA tile may exceed an extent or border of a given region of interest, data collection values along a part of the DMA tile in the extra-ROI region of an n-dimensional data object may be satisfied with predetermined values that may be dynamically injected into the DMA tile or otherwise, provided with the DMA tile at or before a time of data collection.

2.38 Configuring a Padding DMA||Border Data Collecting DMA

S230 optionally includes S238, which includes configuring a data collection tile or parameters for collecting data values bordering a tile, may function to generate one or more parameters for a given data collection tile that enables a collection of excess data values beyond one or more borders of a shape of the given data collection tile.

In one or more embodiments, S238 may function to configure a data collection tile that additionally collects data bordering an outside of a shape of the tile based on memory transfer parameters. In such embodiments, if the data collection tile and bordering data values are located entirely within a region of interest, S238 may function to generate instructions that indicate an extent to which data collection of outside bordering values may be collected. In one example, if memory transfer parameters or input indicate a requirement for bordering data, S238 may compute an exo-boundary value such as "+2" that may instruct the DMA to collect two additional lines of data beyond a DMA tile shape.

Additionally, or alternatively, in some embodiments, if a data collection tile may be arranged at a corner or adjacent a side of a region of interest such that requested bordering data values lie beyond a region of interest, S238 may function to configure data collection parameters or instructions that may function to extend the region of interest to include the bordering data values and compute data collection instructions that enable a collection of the bordering data values together with the data values lying within a shape of a given data collection tile.

In some embodiments, if a region of interest is positioned or located at one or more boundaries of an n-dimensional data object or tensor, S238 may function to extend, pad, or augment the region of interest with additional data values since additional data values may not be available or exist beyond the one or more boundaries of the tensor.

2.40 Computing DMA Translation/Transposition Parameters||Recycling Data Collection Parameters S240, which includes configuring transpositional data collection parameters or instructions, may function to generate a transpositional or recycling DMA based on memory transfer parameters that include one or more of a transpositional iterator type and a selection of a non-primary or secondary axis for initializing multiple iterations of a given DMA.

Additionally, or alternatively, in one or more embodiments, configuring transpositional data collection/instructions or parameters may be based on identifying that a single DMA may be insufficient for collecting an entirety of a target corpus of data that may be required or requested for processing. In such embodiments, S240 may function to compute a number of DMAs that may be required for collecting the corpus of data and configure a transpositional DMA that may be used a plurality of distinct instances to collect the corpus of data from a region of interest or the like of an n-dimensional data object.

Transcribed DMA

In a first implementation, based on identifying multiple DMAs may be required for collecting a corpus of data for processing, S240 may function to configure data collection parameters for implementing at least a first instance of a DMA for collecting a first part of the corpus of data and configure transcription parameters or instructions that, when executed, causes an automated copying of the data collection parameters of the first DMA to generate one or more additional DMA instances (e.g., $2^{nd}$, $3^{rd}$, $4^{th}$ instances of the DMA) for collecting a remainder of the corpus of data (e.g., $2^{nd}$, $3^{rd}$, $4^{th}$ parts of the corpus of data) until an entirety of the corpus of data is collected using a same DMA. Thus, a plurality of DMA instructions may be generated via a copying of instructions for implementing an original or an initial DMA.

Additionally, or alternatively, in this first implementation, S240 may function to compute, for each subsequent copy of the data collection parameters (i.e., DMA), a distinct base (memory) address from the base address of the first instance of the DMA (i.e., the original DMA). In one or more embodiments, S240 may function to derive the distinct base address based on a value of the base address of the first DMA. That is, in a computation of the one or more distinct base addresses of the one or more copies of the DMA, S240 may function to use the base address of the first or original DMA as input for computing a new and varied base address for each of the one or more copies of the DMA. In some embodiments, S24 may function to compute the one or more distinct base addresses based on an identified iterator type input. In such embodiments, the iterator type input may function to implicate a desired pattern and/or direction of movement of the one or more copies of the DMA thereby informing a computation of the one or more distinct base addresses for each of the one or more copies of the DMA.

Additionally, or alternatively, 240 may function to chain together each of the base addresses for each copy and/or iteration of the transpositional DMA that is executed for accessing and/or transferring data. Accordingly, in such embodiments, a DMA engine and/or a scheduler executing the transpositional DMA may function to reference the chain of base addresses of the transpositional DMA and automatically initialize and cause to execute an iteration or copy of the transpositional DMA at each of the distinct bases addresses of the chain.

Recycled DMA

In a second implementation, based on identifying multiple DMAs may be required for collecting a corpus of data for processing, S240 may function to configure recycling parameters or instructions that, when executed, causes an automated recycling of the data collection parameters of a transpositional DMA for executing multiple DMAs using the exact data collection parameters with the exception of base address parameters. Similar to the first implementation, the base address for each recycle DMA instance may be distinct from the original base address and may be derived therefrom. It shall be noted that while the additional or new base addresses for each recycled or transcribed DMA instance may be derived, as previously described, in some embodiments, S240 may function to compute distinct base addresses for each transcribed or recycled DMA instance based on adjusting or changing the original base address of the original or first DMA. That is, in some embodiments, S240 may function to adjust one or more of the coordinates or address values of the base address of the original DMA to achieve new base addresses or starting points for initializing transcribed or recycled DMA instances.

It shall be recognized that, in some embodiments, the computation of the additional and/or distinct base addresses for each transcribed or recycled instance of a DMA may be performed statically, at compile time, such that the distinct base addresses are known in advance and may not require the intervention of a central processing unit or the like to dynamically generate new base address values. Additionally, or alternatively, the computation of the additional and/or distinct base addresses for each transcribed or recycled instance of a DMA may be performed dynamically, at runtime, by a specifically configured DMA engine (e.g., circuit or module) that may be programmed to generate distinct base addresses for a transpositional DMA without the intervention of a central processing unit or a distinct memory addressing circuit.

2.50 Executing a Transpositional or Walking DMA

S250, which includes executing one or more intelligent memory transfers or accesses, may function to execute a transpositional DMA throughout a region of interest for collecting a target corpus of data for processing by an array of processing circuits or the like of an integrated circuit. In one or more embodiments, the one or more intelligent memory transfers may be performed between an on-chip memory (OCM) and an array of processing cores or circuits of an integrated circuit (e.g., integrated circuit or system 100).

In one or more embodiments, S250 may function to execute a transpositional DMA based on based on identifying a region of interest within an n-dimensional data object, such as a tensor. In such embodiments, S250 may function to initialize an instance of the transpositional DMA at a base address within the identified region of interest and implement a data collection pattern or scheme of the transpositional DMA for collecting a block of data (i.e., tile block of data). Accordingly, the base address preferably relates to a starting address at which the transpositional DMA may begin fetching data from within the region of interest. In some embodiments, initializing the transpositional DMA within a region of interest may appear to include arranging a graphical representation of the transpositional DMA, such as a DMA tile, at the base address thereby encompassing at least part of the target corpus of data that the transpositional DMA may collect during a first set of iterations of the DMA tile along a dimensional axis or direction of the region of interest.

Accordingly, in one or more embodiments, based on a collection of a tile block of data and/or a completion of an execution of a first instance of the transpositional DMA, S250 may function to automatically re-initialize the transpositional DMA at a new or distinct base address within the region of interest for collecting a new or distinct tile block of data of the target corpus of data that may be required for processing.

In a first implementation, re-initializing the transpositional DMA includes transcribing data collection parameters or instructions of the transpositional DMA and identifying a new or distinct base address at which the DMA tile shape of the transpositional DMA may be transposed and/or arranged for collecting a subsequent tile block of data. In this first implementation, the transcription of the data collection parameters includes a copying of the data collection parameters or instructions while injecting a new base address for executing a subsequent or new instance of the transpositional DMA. In some embodiments, injecting the new base address includes identifying the base address (e.g., B0) parameters of the prior transpositional DMA instance (e.g., DMAn-1) and replacing the base address with a new, distinct base address (B1) of the new instance of the transpositional DMA.

Figure 5:
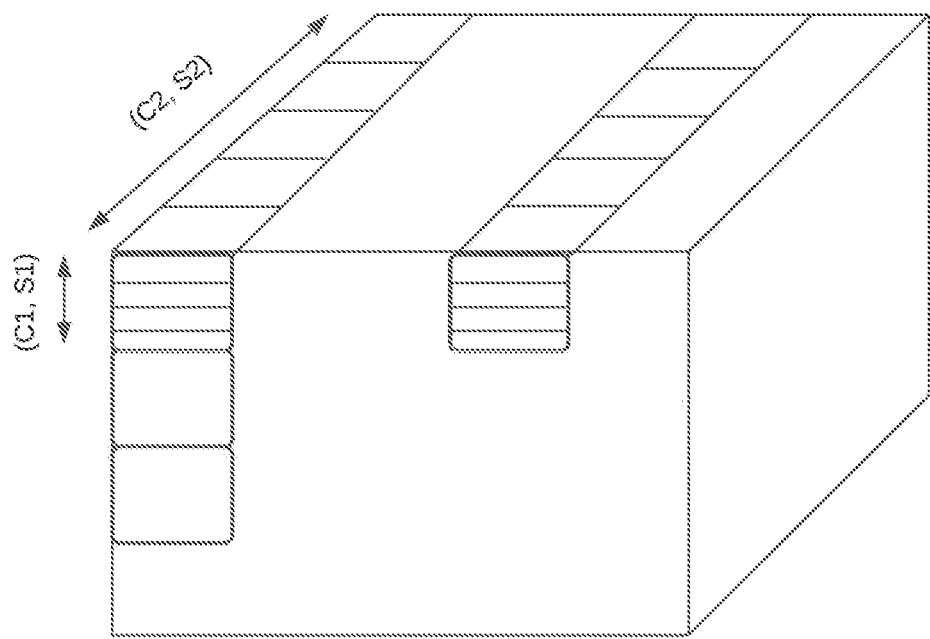
FIG. 5 illustrates an exemplary schematic demonstrating a walking DMA in accordance with one or more embodiments of the present application.

In a second implementation, re-initializing the transpositional DMA includes recycling data collection parameters or instructions of the transpositional DMA and identifying a new or distinct base address at which the DMA tile shape of the transpositional DMA may be transposed and/or arranged for collecting a subsequent tile block of data. In this second implementation, the recycling of the data collection parameters includes a re-using or re-executing the data collection parameters or instructions of the transpositional DMA while amending or changing the base address parameters to a new value. In some embodiments, an amendment of the base address parameters of the transpositional DMA includes changing a single offset parameter (e.g., xy, xz, etc.) or single base address parameter that may function to move the transpositional DMA along a single dimension of the region of interest while maintaining all other offset parameters of the base address. Additionally, or alternatively, multiple offset parameters of the base address of the transpositional DMA may be amended or changed to move and re-initialize the transpositional DMA for collecting a distinct tile block of data within the region of interest, as shown by way of example in FIG. 5.

Preferably, during the data fetching processing using the transpositional DMA, S250 may function to transfer from the region of interest, which may include a region stored on an on-chip memory or other fast-accessible memory (e.g., cache memory), each tile block of data to local storage (e.g., data registers) within an array of processing circuits as the tile blocks of data may be completed by an execution of a single instance of the transpositional DMA. It shall be recognized that a single instance of a transpositional DMA may include multiple iterations of a DMA tile shape for collecting data along a dimensional direction within a region of interest that may be used in completing or building a tile block of data.

It shall be noted that S250 may function to re-initialize the transpositional DMA based on one or more of a recycling and a transcription of the transpositional DMA tile parameters for one or more additional instances to allow an efficient collection of data within a given region of interest for building or aggregating a target corpus of data. Once the target corpus of data is collected and transferred from an n-dimensional data object, in some embodiments, S250 may function to terminate a recycling or continued use of the transpositional DMA in performing the intelligent memory transfer based on the identified region of interest.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for accelerated memory transfers in an integrated circuit, the method comprising:
    configuring a memory transfer of a target corpus of data from a double data rate (DDR) memory of the integrated circuit based on memory access parameters;
    creating direct memory access (DMA) instructions for the memory transfer, wherein the creating the DMA instructions include:
        (i) defining dimensions of a data access tile based on a first parameter of the memory access parameters;
        (ii) generating multi-directional data accessing instructions that, when executed, automatically moves the data access tile along at least one axis of multiple distinct axes within the DDR memory based at least on a second parameter of the memory access parameters;
    transferring the target corpus of data from the DDR memory to an array of processing cores of the integrated circuit based on executing the DMA instructions.

2. The method according to claim 1, wherein creating the DMA instructions further includes:
    (i) defining dimensions of a distinct data access tile for accessing data stored in an on-chip memory (OCM) based on the memory access parameters; and
    (ii) generating multi-directional data accessing instructions that, when executed, automatically moves the distinct data access tile along at least one axis of multiple distinct axes within the OCM based on the memory access parameters.

3. The method according to claim 1, wherein transferring the target corpus of data further includes:
    transferring the target corpus of data from the DDR memory using the data access tile to an on-chip memory (OCM); and
    transferring the target corpus of data from the OCM to the array of processing cores.

4. A method for accelerated memory transfers in an integrated circuit, the method comprising:
    configuring a memory transfer of a target corpus of data from an on-chip memory (OCM) of the integrated circuit based on memory access parameters;
    creating direct memory access (DMA) instructions for the memory transfer, wherein the creating the DMA instructions include:
        (i) defining dimensions of a data access tile based on the memory access parameters;
        (ii) generating multi-directional data accessing instructions that, when executed, automatically moves the data access tile along at least one axis of multiple distinct axes within the OCM based at least on the memory access parameters;
    transferring the target corpus of data from the OCM to an array of processing circuits of the integrated circuit based on executing the DMA instructions.

5. The method according to claim 4, further comprising:
    generating intra-data access tile data accessing instructions that inform a pattern for collecting lines of data within a body of the data access tile, wherein the intra-data access tile data accessing instructions include:
        a line-to-line movement instruction that informs a pattern of movement from an instant line of data within the data access tile at which an active collection of data is performed to a subsequent line of data within the body of the data access tile at which a subsequent collection of data will be performed, wherein the pattern of movement identifies a number of lines that are bypassed between the instant line of data and the subsequent line of data.

6. The method according to claim 5, wherein the intra-data access tile data accessing instructions further include:
    a looping instruction that informs a number of instances of execution of the line-to-line movement instruction for collecting a plurality of distinct lines of data within the data access tile.

7. The method according to claim 4, wherein the multi-directional data accessing instructions include:
    a tile transposition instruction that informs a pattern of moving the data access tile along a second direction of the OCM based on a completion of a collection of data by the data access tile along a first direction of the OCM.

8. The method according to claim 4, wherein the multi-directional data accessing instructions further include:
    a tile transposition looping instruction that informs a number of instances of execution of a tile transposition instruction for collecting, by the data access tile, a plurality of distinct tiles of data within the OCM.

9. The method according to claim 4, wherein executing the DMA instructions includes:
    accessing data by moving the data access tile a predetermined number of times along a first direction within the OCM, and
    upon completion of the movement of the data access tile along the first direction, (a) automatically moving the data access tile in a second direction within the OCM and (b) restarting the accessing data along the first direction within the OCM based on moving the data access tile in the second direction.

10. The method according to claim 9, wherein moving the data access tile in the second direction includes moving the data access tile to a location within the OCM that is nonoverlapping with a prior location within the OCM of the data access tile.

11. The method according to claim 4, wherein generating multi-directional data accessing instructions includes:
   generating a sequence of base memory addresses, where each distinct base memory address of the sequence of base memory addresses is associated with a distinct iteration of the data access tile.

12. The method according to claim 4, further comprising: configuring a direct memory access (DMA) mask based on identifying that an iteration of the data access tile will likely exceed a boundary of the OCM, wherein the DMA mask includes data access instructions that, when executed, generate predetermined data values along an extent of the data access tile that exceeds the boundary of the OCM.

13. The method according to claim 4, further comprising: configuring exo-tile boundary data access instructions based on the memory access parameters requiring a collection of data that exceeds at least one boundary of the data access tile and encompasses the at least one boundary of the data access tile, wherein the exo-tile boundary data access instructions, when executed, causes a collection, by the data access tile, of data values encompassing the at least one boundary of the data access tile.

14. The method according to claim 4, wherein the memory access parameters include:
   a first parameter of the memory access parameters that identifies dimensions of the OCM; and
   a second parameter of the memory access parameters that identifies a data access scheme of a plurality of distinct data access schemes that informs a creation of the multi-directional data accessing instructions.

15. The method according to claim 14, wherein the memory access parameters further include:
   a third parameter that identifies a second direction for performing data access using the data access tile within the OCM that is distinct from a first direction for data access using the data access tile within the OCM.

16. The method according to claim 4, wherein generating the multi-directional data accessing instructions includes generating transpositional DMA instructions that include:
   (i) a data access pattern that, when executed, implements a plurality of distinct executions of a data collection tile at a plurality of distinct base memory addresses along the OCM, and
   (ii) a transposition instruction that automatically moves the data collection tile from an instant base memory address to a subsequent base memory address of the plurality of distinct base memory addresses based on a completion of an accessing of data by the data access tile at the instant base memory address.

17. The method according to claim 4, wherein generating the multi-directional data accessing instructions includes generating recycling DMA instructions that include:
   (i) a data access pattern that, when executed, implements an accessing of data by the data access tile at an instant base memory address of a sequence of base memory addresses within the OCM, and
   (ii) a recycle instruction that, when executed, automatically recycles a data collection tile at a distinct base memory address of the sequence of base memory addresses based on a completion of the accessing of data by the data access tile at the instant base memory address.

18. A method comprising:
identifying, via a front-end application programming interface (API), a set of memory access parameters for transferring data between distinct memory components;
creating data fetching instructions executable by one or more circuits of an integrated circuit, wherein creating the data fetching instructions includes:
   (i) defining a shape of a direct memory access (DMA) tile that, when executed, accesses data from within an on-chip memory (OCM);
   (ii) generating multi-directional DMA instructions that, when executed, iterates the DMA tile along multiple distinct axes within the OCM for transferring a target corpus of data; and
transferring the target corpus of data from the OCM to a plurality of distinct processing cores of the integrated circuit based on executing the data fetching instructions.

19. The method according to claim 18, further comprising:
implementing a front-end application programming interface (API) that receives the set of memory access parameters for transferring data between distinct memory components; and
implementing a DMA circuit that transfers the target corpus of data from the OCM to the plurality of distinct processing cores based on executing the data fetching instructions.

20. The method according to claim 18, further comprising:
implementing an iterator application programming interface (API) executing a software development kit that converts the set of memory access parameters to the data fetching instructions executable by one or more circuits of the integrated circuit.

* * * * *